United States Patent [19]

Chait

[11] Patent Number: 5,486,845
[45] Date of Patent: Jan. 23, 1996

[54] NON-LINTING BALL GASKET FOR COMPUTER MOUSE DEVICES AND METHOD

[76] Inventor: Abraham I. Chait, 730 Clearfield Dr., Millbrae, Calif. 94030

[21] Appl. No.: 333,734

[22] Filed: Nov. 3, 1994

Related U.S. Application Data

[63] Continuation-in-part of Ser. No. 208,385, Mar. 10, 1994, abandoned.

[51] Int. Cl.⁶ .................................................. G09G 5/08
[52] U.S. Cl. ..................... 345/163; 345/167; 74/471 XY; 273/148 B
[58] Field of Search ................................. 345/156, 157, 345/163, 167; 74/471 XY; 273/148 B

[56] References Cited

U.S. PATENT DOCUMENTS

| | | |
|---|---|---|
| 3,901,518 | 8/1975 | Uchida . |
| 3,987,685 | 10/1976 | Opocensky . |
| 4,369,978 | 1/1983 | Watanabe . |
| 4,404,865 | 9/1983 | Kim . |
| 4,505,165 | 3/1985 | Wiczer . |
| 4,559,532 | 12/1985 | Hosogoe . |
| 4,562,347 | 12/1985 | Hovey et al. . |
| 4,612,539 | 9/1985 | Hosogoe et al. . |
| 4,807,890 | 2/1989 | Gorman et al. . |
| 4,854,739 | 8/1989 | Forster . |
| 4,856,795 | 8/1989 | DeLano et al. . |
| 4,881,065 | 11/1989 | Soma et al. . |
| 4,951,034 | 8/1990 | Mazzone et al. . |
| 5,214,415 | 5/1993 | Pandolei . |

FOREIGN PATENT DOCUMENTS

| | | |
|---|---|---|
| 60-276070 | 6/1987 | Japan . |
| 194422 | 4/1989 | Japan . |

*Primary Examiner*—Ulysses Weldon
*Assistant Examiner*—Matthew Luu
*Attorney, Agent, or Firm*—Flehr, Hohbach, Test, Albritton & Herbert

[57] ABSTRACT

A lint-free gasket including an absorbent pad and a lint-free netting. The gasket engages a ball within a computer mouse device to substantially reduce amounts of debris, moisture, and oil that adheres to the ball's surface and any lint from that my be released from the gasket's highly absorbent pad from being transmitted by the ball to the plurality of the cursor control rollers or other control contacts within a mouse device.

12 Claims, 4 Drawing Sheets

NON-LINTING BALL GASKET FOR COMPUTER MOUSE DEVICES AND METHOD

CROSS REFERENCE TO RELATED PATENT APPLICATIONS

This is a continuation-in-part application of my copending application Ser. No. 08/208,385, filed on Mar. 10, 1994, now abandoned, entitled "Ball Gasket for Computer Mouse Devices." The disclosure of U.S. patent application Ser. No. 08/208,385 is hereby incorporated by reference.

TECHNICAL FIELD

The invention relates generally to a computer mouse device (pointing device), and more specifically to a special lint-free gasket that engages a ball within the computer mouse device such that the gasket substantially impedes the movement of debris (e.g., dust, oil, lint, and moisture) that my adhere to the ball from being deposited onto the plurality of rollers and control contacts (hereafter referred to as "rollers") that frictionally engage the ball within the mouse.

BACKGROUND ART

Various forms of conventional electronic mice, pointing devices and trackball electronic mice are known. Examples of electronic mice are shown in U.S. Pat. No. 3,987,685 and U.S. Pat. No. 4,951,034. Still other forms are marketed by Apple, Microsoft, Kraft Systems Inc. and other companies. Stylus-like electronic pointing devices are marketed by Appoint and other companies. Each of these devices operates in a fundamentally similar way. Each employs a ball located within a housing such that the rotation of the ball causes generation of either an electrical, mechanical, or optical indicia when the ball is rotated. In many mice, the ball is moved when it comes into frictional contact with a surface such as a desk top or when the ball is moved with a part of the human hand such as a thumb, finger, or palm.

The typical mouse has a ball that, when rotated, positions a cursor on a computer screen. The ball is contained within a housing by various means, and partially protrudes through an opening in the housing. The ball is rotated in a circular fashion to position the cursor on the computer screen. The ball frictionally engages control rollers. The control rollers' drive engaged shaft encoders by various means. Indicia of movement are generated by the shaft encoders operating along X and Y axes so that angular movements can be tracked with accuracy. The shaft encoders send cursor positioning signals using conventional techniques to the computer via various means. The signals are used by the computer's software to control the cursor position on the computer screen.

Many mice use a ball retaining clip to allow access to the ball and control rollers. The clip is attached to the housing by any suitable means. The housing or clip opening does not intimately conform with the ball; resulting in a gap that allows debris to enter the housing.

There are patents that describe the use of cleaning devices, such as a brush, felt, sponge, rubber blade, and rotatable rollers with specially designed grooves, which remain in contact with the ball and clean the dirt and dust that adhere to the ball. While the devices may remove debris from the ball's surface, some of the materials in these devices themselves tend to shed fibers or fragments of the cleaning surface material (hereafter referred to as "lint") which are carried by the ball to the control rollers. Debris, moisture, oil, and lint accumulates on the control rollers which tends to cause the rollers to perform abnormally, thereby reducing the ability of the rollers to accurately control the movement of the cursor on the screen.

Ozaki (JP 60-276070) discloses two cleaning devices for a pointing device that is slid on a flat surface: a cleaning device including a material that circumscribes and cleans a portion of the ball and a set of cleaning devices having materials that clean the encoder rollers. The cleaning device that cleans a portion of the ball is made up of bristles. The spaces between the bristles allow small amounts of fine dust and dirt to pass between the bristles. The cleaning device that cleans the rollers is unspecified as to type of material. The roller cleaning device may be required due to the deficiency of the ball cleaning device in adequately cleaning the ball. The roller cleaning device, as stated in the patent, does not prevent the rollers from being contaminated by dust and dirt but only cleans the dust and dirt that accumulates on the rollers. In addition the patent does not cover moisture and oil that may adhere to the ball.

Okitsu and Imai (JP 1-94422) discloses a list of cleaning materials that may be inserted into cleaning device mounted in a hole in a pointing device. The purpose of the cleaning materials is to clean the ball of rubber eraser fragments, paper pieces, and dust. The cleaning materials listed include a brush, felt, sponge, and rubber panel. The cleaning material is shaped to cover a small portion of the ball. The brush is made of bristles that have spaces between the bristles. The felt and sponge will tend to trap the debris and dust and absorb moisture and oil. The rubber panel will wipe the debris, dust, moisture, and oil on the ball. The cleaning materials and the positioning of the cleaning material do not provide an optimal cleaning system for dust, moisture, oil, and lint. The bristles tend to wipe the debris; but, do not absorb moisture and oil. The spaces between the bristles allow small amounts of fine dust, dirt, moisture, and oil to pass between the bristles and continue to adhere to the ball. The felt tends to release fiber (lint) which may adhere to the ball and be carried to the control rollers. The sponge tends to have problems with oil retention on its surface and limited surface fragmentation. Some of the oil that comes in contact with the sponge will tend to stay on the sponge's surface. Over a period of usage small fragments of the sponge will tend to break off the sponge's surface. The surface oil and fragments from the sponge will tend to adhere to the ball and be carried to the control wheels. The rubber panel will tend to wipe but not absorb the moisture and oil; thereby, allowing some of the moisture and oil to be spread and retained by the ball. The cleaning device is constructed so that it does not circumscribe contiguously the inside of the ball opening and the ball. The cleaning device is not positioned between the ball surface exposed to outside of the mouse case and the mouse control rollers. The placement of the cleaning materials is such that the foreign materials, dust, lint or cleaning surface fragments, moisture, and oil that adheres to the ball may not be wiped off or absorbed before that portion of the ball comes in contact with the control rollers; and thereby, reduce the responsiveness of the control rollers.

Pandolei (U.S. Pat. No. 5,214,415) discloses a conductive enclosure for an electronic pointing device which also includes a seal to keep out environmental contaminants such as dirt and water.

In a trackball device a conductive brush surrounds the ball where it protrudes from the housing primarily to provide a completely conductive enclosure with a resilient circumferential ring outboard of the conductive brush which also seals out environmental contaminates such as dirt and moisture. In a slide-roller device a conductive plastic bearing seal is utilized to allow axial and radial low friction motion. This bearing also acts as a seal to prevent environmental contaminates such as water, sand, and dirt from entering the unit. The brush is made up of conductive fingers of copper. The plastic bearing seal is made from such materials as Teflon or Rulon. The brush and seal do not provide an optimal cleaning system for moisture, sand, oil, and dirt. The brush has spaces between the copper bristles. The spaces tend to allow small amounts of dust, dirt, sand, water, other moisture, and oil to pass between the fingers. The copper bristles would wipe the debris and do not have the ability to absorb moisture and oil. The plastic ring also wipes the debris and has little if any ability to absorb moisture and oil.

Soma (U.S. Pat. No. 4,881,065) discloses a cleaning member and rotatable rollers with specially designed grooves to provide an X-Y input apparatus capable of depositing less contamination on the control roller members and also of preventing deterioration of detecting precision. The cleaning member is made of felt, sponge, or thick non-woven fabric. The felt and the thick non-woven fabric will tend to trap the debris and dust and absorb some moisture and oil. The sponge will tend to trap the debris and dust and absorb some moisture and oil. Contamination such as dust is wiped from the ball to the rotatable rollers to the grooves formed on the first and second rotating members of the rollers. The cleaning member and the rotatable rollers with specially designed grooves do not provide an optimal cleaning system to trap the debris and dust and absorb moisture and oil. The felt and the thick non-woven fabric will tend to release fiber (lint) which may adhere to the ball and be carried to the control rollers where the fiber will reduce the responsiveness of the control rollers. Over a period of usage small fragments of the sponge will tend to break off the sponge's surface. The surface oil and fragments from the sponge will tend to adhere to the ball and be carried to the control rollers. The placement of the cleaning member is such that foreign particles, moisture, and oil that adheres to the ball may not be wiped off or absorbed before that portion of the ball comes in contact with the control rollers. Rotatable rollers with specially designed grooves is in contact with the ball. The contact portion of the rollers wipes the debris so that the debris is moved to the groove portion of the roller. Any debris, dust, moisture, and oil remaining on the contact portion of the roller will reduce the effectiveness of the controls.

Hosogoe (U.S. Pat. No. 4,559,532) discloses a rejector projection, a resilient ball protection member, and an annular groove to ensure that the X-Y input device operates smoothly and properly. The rejector projection on the lower surface of the casing can wipe foreign matter such as pieces of paper and cut threads during operation of the X-Y input device. The annular ball protection member is made from synthetic rubber or soft synthetic resin surrounds the peripheral edge of the input device opening. The primary purpose of the ball protection member is to dampen the ball against noise or damage. The ball protection member substantially fills the gap between the opening and the ball and tends to prevent entry of dust or other foreign matter into the casing. The annular groove serves to trap water entering through the switch opening on top of the device. The rejector projection, resilient ball protection member, and annular groove do not provide an optimal cleaning system for removing dust, moisture, oil, and lint from the ball. The rejector projection and the resilient ball protection member do not absorb moisture or oils. The annular groove does not clean the ball.

A built-up of debris, moisture, oil and lint tend to accumulate with usage on the rollers. The build-up tends to cause the rollers to perform abnormally, thereby reducing the ability of the rollers to accurately control the movement of the cursor on the screen. The invention lessens or eliminates these concerns, as will be appreciated from the following summary of the invention.

SUMMARY OF THE INVENTION

The invention avoids the aforementioned limitations of the prior art by providing a gasket with a unique construction and positioned so as to impede the movement of debris, moisture, oil and lint that adheres to the ball's surface from being transmitted to the rollers and other means that frictionally engage the ball.

It is, therefore, a prime objective of the invention to provide an improved gasket that has increased debris, moisture, oil and lint removal characteristics.

It is another objective of the invention to provide an improved gasket that is highly absorbent of both moisture and oil.

It is another objective of the invention to provide an improved gasket that is lint-free.

In accordance with the invention, a gasket is constructed with a highly absorbent material combined with a lint-free barrier.

In a preferred embodiment the lint-free barrier is a pad of lint-free netting that is bonded with an adhesive such as contact cement to a highly absorbent pad of material. The highly absorbent material may be made of fabric, felt, paper, polyester, or cotton. The lint-free open netting is in the range of 20 to 80 mesh in size. The netting may be made of nonwoven or woven material composed of such material as polyester, polypropylene, polyethylene, nylon, or plastic. The upper surface of the netting is in contact with the ball. Most of the debris, moisture, and oil removed from the ball by the netting is absorbed by the highly absorbent pad. The remainder of the debris, moisture, and oil are captured by netting's open mesh. Lint released by the highly absorbent pad is also captured by the netting's open mesh. One or more layers of netting may be used.

In another preferred embodiment a small amount of cleaning fluid is added to the pad. A slight amount of the cleaning fluid from the pad will tend to come in contact with and adhere to the ball. The cleaning fluid will be carried to the rollers. The cleaning fluid will tend to clean the rollers thereby improving the friction between the ball and the rollers. The cleaning fluid is nonallergenic such as water with a slight amount of soap. The cleaning fluid may include a softening and/or conditioning agent for rollers made of rubber or other material.

In another preferred embodiment a woven highly absorbent fabric made from thread such as cotton which is coated with lint-free covering. One thread is coated with a hydrophilic polymer such as polyethylene oxide carboxymethyln cellulose mixture to absorb moisture and the another thread is coated with a hydrophobic carbon absorber such as silicon rubber mixture to absorb most oils. Both threads are woven into a highly water and oil absorbent fabric for use as gasket material.

In another preferred embodiment a woven fabric is made of alternating lint-free water and oil absorbent threads. One thread is made of a hydrophilic polymer such as nylon to absorb moisture and the other thread is made of a hydrophobic carbon absorber such as silicon rubber to absorb most oils. Both threads are woven into a highly water and oil absorbent fabric for use as gasket material.

BRIEF DESCRIPTION OF THE DRAWINGS

These and other objectives of the invention will be better appreciated from the following Detailed Description of the invention, in which.

DETAILED DESCRIPTION OF THE INVENTION

Figure 1:
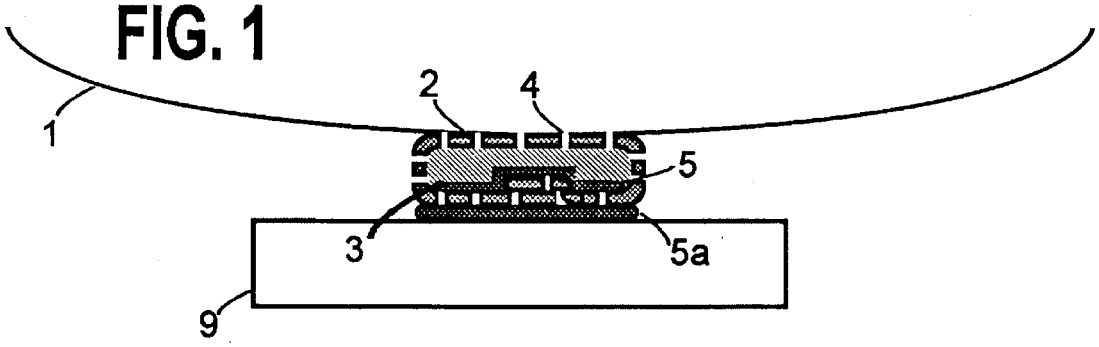
FIG. 1 is a schematic, side elevation view, in cross section, of the lint-free cleaning gasket constructed in accordance with the present invention.

While the invention is susceptible of embodiment in many different forms, there are shown in the drawings and will herein be described in detail preferred embodiments of the invention. It should be understood, however, that the present disclosure is to be considered as an exemplifications of the principles of the invention and is not intended to limit the spirit and scope of the invention and/or claims to the embodiments illustrated.

Referring to FIG. 1, a preferred embodiment of the invention is the gasket which is constructed by securing a lint-free netting 2 by various means enclosing a highly absorbent pad 3. Pad 3 may be a woven fabric, felt, paper, polyester or cotton, but preferably it is suitable to absorb both oil and water. One of the preferred means of attachment is to apply a thin layer of adhesive 5 to one side of the absorbent pad 3. One formulation of the adhesive 5 is Petroleum Naphtha 64742-89-8, Methyl Ethyl Ketone 78-93-3, Toluene 108-88-3, TSRN-618608-5001P, and TSRN-618608-5023P. Wrap the lint-free netting 2 around the absorbent pad 3 where the cut netting 2 is held by the adhesive 5 to the absorbent pad 3. The adhesive 5 side of the pad and netting is secured with additional adhesive 5a to a gasket mounting structure, such as a clip 9. Alternatively the adhesive 5a can be provided as a pressure sensitive adhesive that is covered by a release paper (not shown) so that the gasket can be applied by the user to the clip 9. The side of the pad and netting without adhesive 5 faces a ball 1 of the mouse or trackball device. Spaces 4 in netting 2 without adhesive will allow the moisture and oil to penetrate the netting 2 and be absorbed by the highly absorbent pad 3. The spaces 4 will also provide access for dirt and other foreign particles to the absorbent pad 3. In addition the spaces 4 will trap fibers (lint) that may be released by the absorbent pad 3 as well as a trap for foreign particles, moisture, and oil that has been wiped by the netting 2 from the ball 1. In addition a small amount of cleaning fluid (not shown) may be added to the pad 3. A slight amount of the cleaning fluid from the pad 3 will tend to come in contact with and adhere to the ball 1. The cleaning fluid will be carried to the control rollers 8. The cleaning fluid will tend to clean the rollers 8 thereby improving the friction between the ball 1 and the rollers 8.

Figure 4:
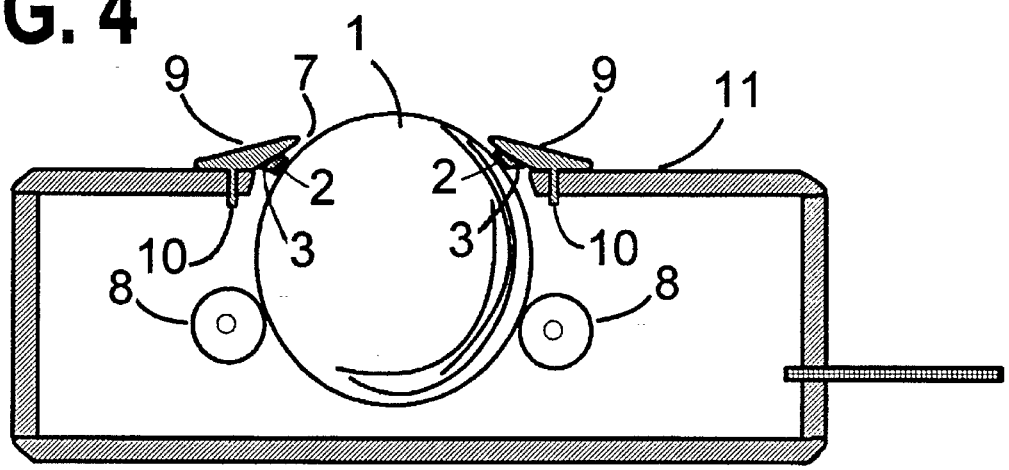
FIG. 4 is a schematic, side elevation view, in cross section, of a trackball electronic mouse including the gasket of the present invention attached to the top clip.

Referring to FIG. 4, a preferred embodiment of the invention is shown mounted in a the trackball electronic mouse. The present gasket, composed of the netting 2 and the pad 3, is secured to the clip 9 using conventional means such as an adhesive; the clip 9 retains the ball 1 in a housing 11 by any suitable means, such as tabs 10 or other conventional techniques; the gasket material of netting 2 and pad 3 extends across a gap 7 that is between the ball 1 and the clip housing 9; the gasket material extends circumferentially completely around the ball; the netting 2 maintains an intimate contact with ball 1; the netting 2 wipes the debris from ball 1 as it is rotated; the pad 3 absorbs moisture and oil and holds debris that is wiped up by the netting 2; and the netting 2 traps fibers and other lint that the pad 3 may release thereby keeping the debris and lint that may adhere to the ball 1 from moving through the gap 7 and being deposited onto the control rollers 8.

Figure 5:
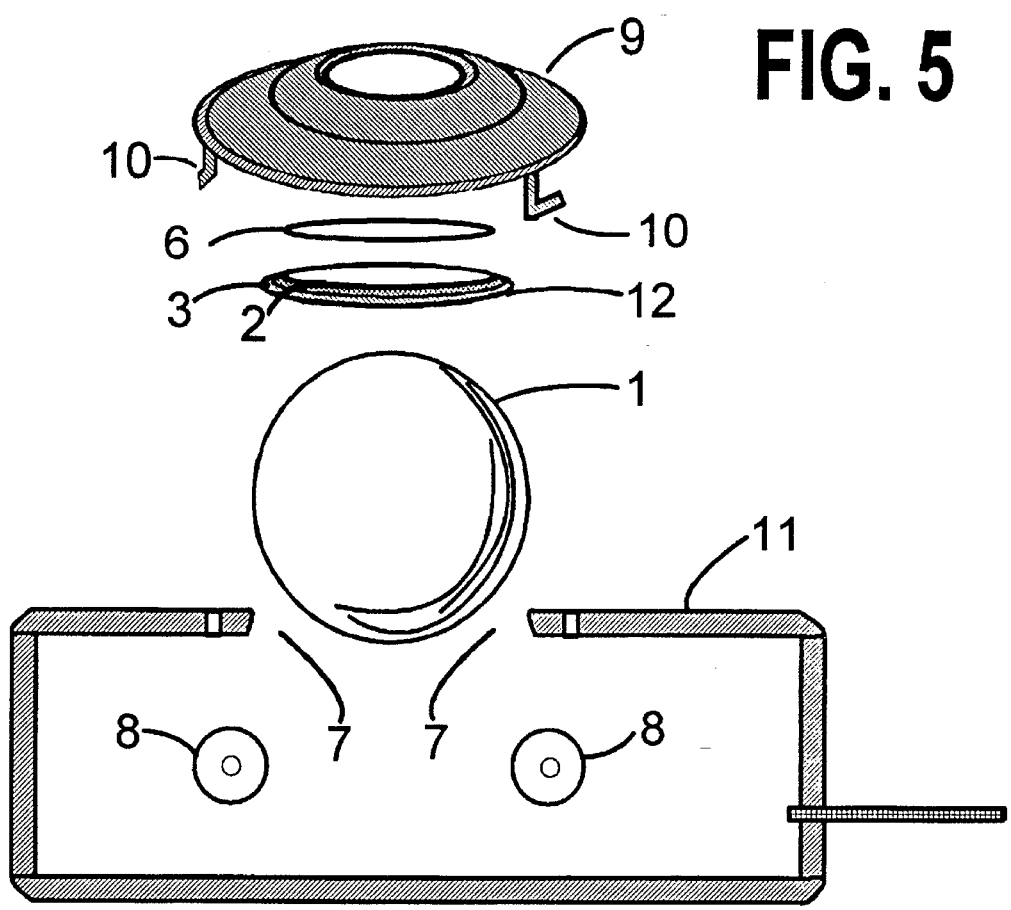
FIG. 5 is an exploded view of the trackball electronic mouse of FIG. 4, showing another mounting assembly for the gasket.

Referring to FIG. 5, in another embodiment of the invention, an annular gasket is constructed by securing the lint-free netting 2 by various means, such as an adhesive, to one side of the highly absorbent annular pad 3, and then intimately bonding the gasket to an annular rim 12, using adhesive, to stabilize the shape of the gasket (netting 2 and pad 3) and ensure the intended contact with the ball. A sheet spring 6 biases the gasket material toward the ball 1. The gasket material comprising netting 2, pad 3, and rim 12 are inserted between the ball 1 and the clip 9; the clip 9 retains the sheet spring 6, gasket material and the ball 1 in the housing 11 by tabs 10 or other conventional techniques; the gasket material extends circumferentially completely around the ball; the netting 2 maintains an intimate contact with ball 1; the netting 2 wipes the debris from ball 1 as it is rotated; the pad 3 absorbs debris, moisture, and oil that is picked up by the netting 2; and the netting 2 traps fibers and other lint that the pad 3 may release thereby keeping the debris and lint that may adhere to the ball 1 from moving through the gap 7 and being deposited onto the control rollers 8.

Figure 6:
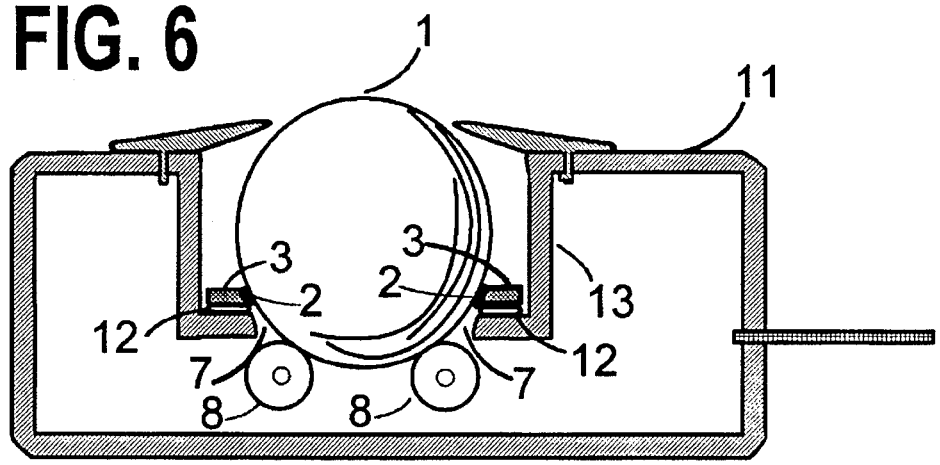
FIG. 6 is a schematic, side elevation view, in cross section of a trackball electronic mouse including the gasket of the present invention attached to the bottom of an enclosed ball housing.

Referring now to FIG. 6, in another embodiment of the invention the gasket is constructed by securing the lint-free netting 2 by various means to one side of the highly absorbent pad 3 and then intimately bonding the gasket to an annular rim 12 using conventional means to stabilize the shape of the gasket (netting 2 and pad 3) to ensure the intended contact with the ball. The gasket material comprising netting 2, pad 3, and rim 12 are placed at the bottom of an enclosed ball housing 13; the gasket material extends circumferentially completely around the ball; the gasket material of netting 2 and pad 3 extends across a gap 7 that is between the ball 1 and the ball housing 13; the netting 2 maintains an intimate contact with ball 1; the netting 2 wipes the debris from ball 1 as it is rotated; the pad absorbs debris, moisture, and oil that is picked up by the netting 2; and the netting 2 traps fibers and other lint that the pad 3 may release thereby keeping the debris and lint that may adhere to the ball 1 from being deposited onto the control rollers 8.

Figure 7:
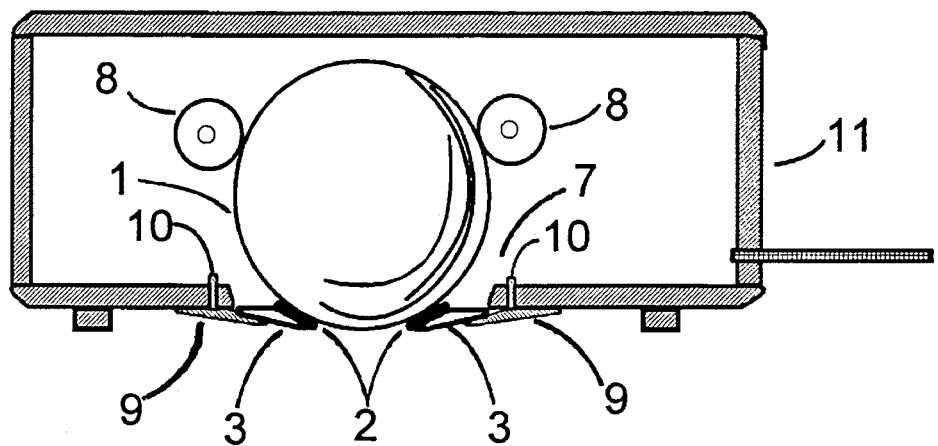
FIG. 7 Is a schematic, side elevation view, in cross section of an other electronic mouse including the gasket of the present invention attached to the bottom clip.

Referring now to FIG. 7, in another preferred embodiment of the invention, an electronic mouse has the present gasket mounted thereto. The gasket is constructed by securing the lint-free netting 2 by an adhesive to one side of the highly absorbent pad 3 which is then intimately bonded to the clip 9 using an adhesive; the clip 9 retains the ball 1 in the housing 11 by tabs 10 or other conventional techniques; the gasket material of netting 2 and pad 3 extends across a gap 7 that is between the ball 1 and the clip housing 9; the gasket material extends circumferentially completely around the ball; the netting 2 maintains an intimate contact with ball 1; the netting 2 wipes the debris from ball 1 as it is rotated; the pad 3 absorbs moisture that is picked up by the netting 2; and the netting 2 traps fibers and other lint that the pad 3 may release thereby keeping the debris and lint that may adhere to the ball 1 from moving through the gap 7 and being deposited onto the control rollers 8.

Figure 2:
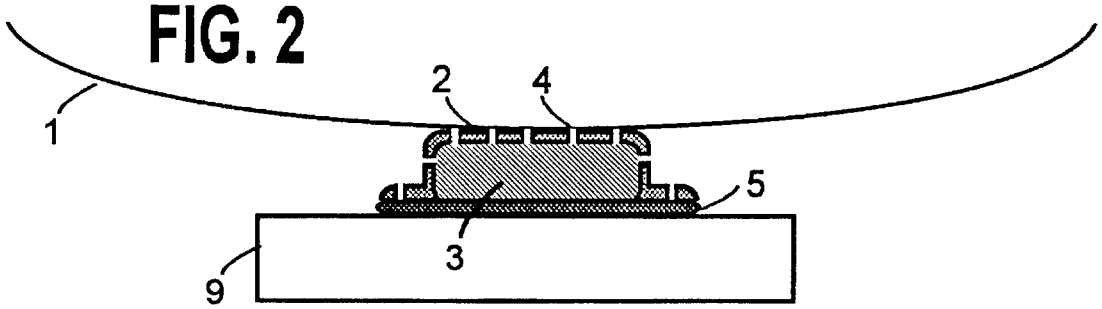
FIG. 2 is a schematic, side elevation view, in cross section, of an alternative embodiment of the lint-free cleaning gasket.

Referring to FIG. 2 an alternative embodiment of the gasket of the invention is shown. Lint-free netting 2 partially encloses highly absorbent pad 3. One of the preferred means of attachment is to apply a layer of adhesive 5 to one side of the absorbent pad 3 to secure the pad 3 to clip 9. The side of the pad 3 and netting 2 without the adhesive 5 faces the ball 1. The spaces 4 without adhesive 5 will allow the moisture and oil to penetrate the netting 2 and be absorbed by the highly absorbent pad 3. The spaces 4 will also provide access for dirt and other foreign particles to the absorbent pad 3. In addition the spaces 4 will trap fibers (lint) that may be released by the absorbent pad 3 as well as a trap for foreign particles, moisture, and oil that has been wiped by the netting 2 from the ball 1.

Figure 3:
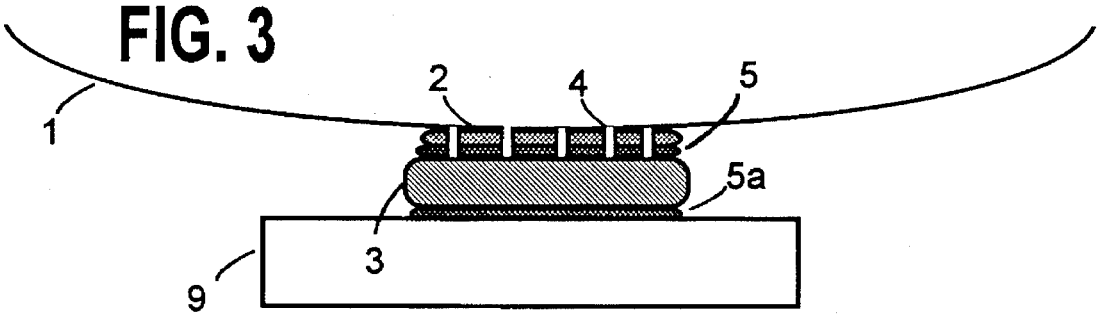
FIG. 3 is a schematic, side elevation view, in cross section, of still a further alternative embodiment of the lint-free cleaning gasket.

Referring to FIG. 3, a further alternative embodiment of the invention is shown in which the gasket constructed by securing the lint-free netting 2 to one side of the highly absorbent pad 3. One of the preferred means of attachment is to apply a thin layer of adhesive 5 to one side of the netting 2. The thin layer of adhesive 5 can be applied by a roller. The adhesive 5 should be thin enough to remain on one side of the netting 2. Apply the netting 2 with the adhesive 5 side to the absorbent pad 3. By this means the adhesive 5 should not bridge the spaces 4 between the netting 2. Secure with adhesive 5a the pad 3 to the clip 9. The spaces 4 will allow the moisture and oil to penetrate the netting 2 and be absorbed by the highly absorbent pad 3. The spaces 4 will also provide access for dirt and other foreign particles to the absorbent pad 3. In addition the spaces 4 will trap fibers (lint) that may be released by the absorbent pad 3 as well as a trap for foreign particles, moisture, and oil that has been wiped by the netting 2 from the ball 1.

Figure 9:
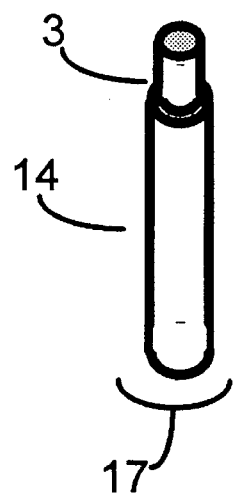
FIG. 9 is a schematic top perspective view, partially broken away, of a thread coated with a hydrophilic polymer.
Figure 10:
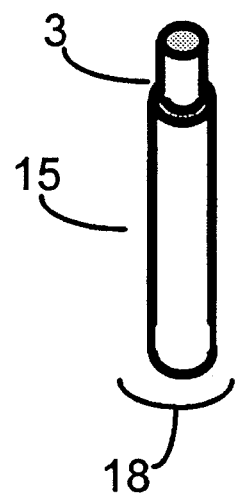
FIG. 10 is a schematic top perspective view, partially broken away, of a thread coated with a hydrophobic polymer.
Figure 8:
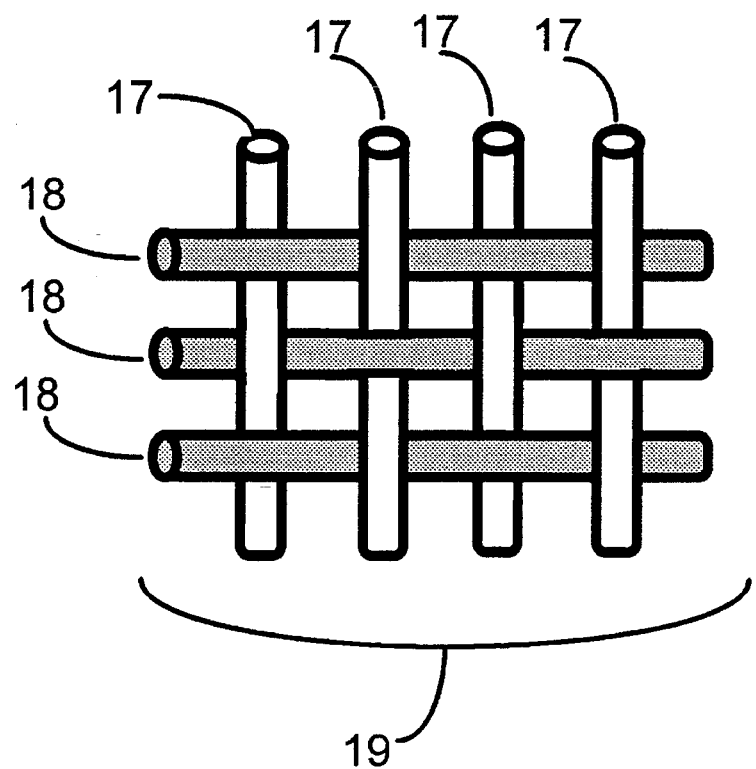
FIG. 8 illustrates the structure of a section of woven fabric of alternating threads of hydrophilic and hydrophobic polymer coated threads.

Referring to FIGS. 8, 9, and 10 in a preferred embodiment a woven highly absorbent fabric 19 is made from a thread, such as cotton 3 (FIGS. 9 and 10), which is coated with lint-free coverings. One thread, such as cotton, 3 is coated with a hydrophilic polymer, such as polyethylene oxide carboxymethyln cellulose mixture 14 (as shown in FIG. 9) to help absorb moisture. The other thread, such as cotton 3, is coated with a hydrophobic carbon absorber such as silicon rubber mixture 15 (as shown in FIG. 10) that helps to absorb most oils. Both threads 17 and 18 are woven into a highly water and oil absorbent fabric 19 (as shown in FIG. 10) for use as gasket material.

Figure 11:
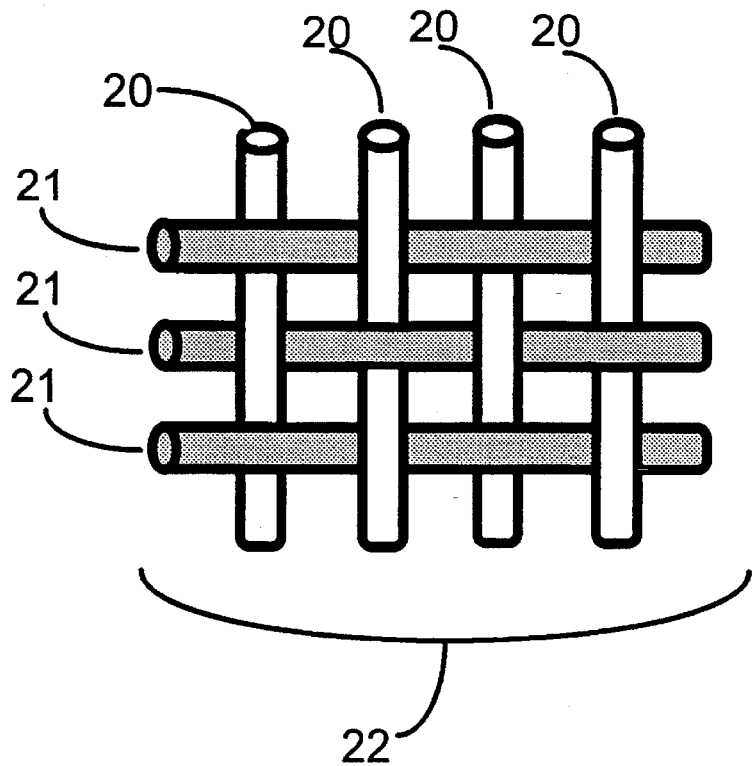
FIG. 11 illustrates the structure of a section of woven fabric of alternating threads of hydrophilic and hydrophobic polymer threads.

Referring to FIG. 11 in an alternative embodiment of the invention the gasket material is constructed with a woven fabric 19 that is made of alternating lint-free water and oil absorbent threads. One thread 20 is made entirely of a hydrophilic polymer, such as nylon, to absorb moisture and the other thread 21 is made of a hydrophobic carbon absorber, such as silicon rubber, to absorb most oils. Both threads 20 and 21 are woven into a highly water and oil absorbent fabric 22 for use as gasket material.

The gasket material may be applied or bonded to parts of the mouse that are in close proximity to the ball 1. The gasket material may be reinforced by known methods such as adhesives as well as securing to a flat or semi-flat rim 12 made with known materials such as plastic, metal, or composite. The gasket material may extend circumferentially in either or both a continuous or a non-continuous in contact with the ball; the rim 12 constructed from such material as plastic, paper, foil, or composite and may be rigid or semi-rigid.

A method of wiping debris, absorbing moisture and oil, and eliminating lint that may be released by the highly absorbent pad from the ball's surface before that portion of the surface comes in contact with the control rollers has been taught herein which may be used on computer electronic mice, pointing devices, and trackball electronic mice.

What is claimed is:

1. An improved cleaning gasket for use in a cursor positioning control device having movable ball control rollers mounted in engagement therewith, said gasket comprising:

a pad of material suitable for absorption of at least one of an oil and water;

a substantially lint-free netting secured to a side of said pad to be mounted in contract with the movable ball of said cursor positioning control device; and said gasket further being formed and dimensioned to be mounted in a position in said control device substantially reducing the transmission of debris, lint, moisture and oil from the movable ball to the control rollers with said netting contacting said ball and said pad positioned to absorb materials wiped off of said ball by said netting.

2. The cleaning gasket as defined in claim 1 wherein, said lint-free netting is a woven netting.

3. The cleaning gasket as defined in claim 1 wherein, said lint-free netting is a non-woven netting.

4. The cleaning gasket as defined in claim 1 wherein, said lint-free netting substantially encloses said pad.

5. The cleaning gasket as defined in claim 1 wherein, said netting is constructed from a fabric having threads coated with a water absorbent material and threads coated with an oil absorbent material.

6. The cleaning gasket as defined in claim 5 wherein, said fabric is a woven fabric, and said threads are cotton threads.

7. The cleaning gasket as defined in claim 1 wherein, said netting is constructed from a fabric having threads formed of a water absorbent material and threads formed of an oil absorbent material.

8. The cleaning gasket as defined in claim 1 wherein, said pad is formed from at least one of a woven fabric, a felt, and a paper.

9. A cursor positioning control device comprising:

a housing;

a moveable ball mounted for rotation in and protruding from said housing;

control rollers in contact with and driven by rotation of said ball; and a cleaning gasket mounted in sliding contact with said ball at a position between said ball and said control rollers to isolate debris carried by said ball from said control rollers, said gasket being provided as an oil and water absorbent pad, and a lint-free netting positioned over a side of said pad between said pad and said ball to contact said ball and wipe debris on said ball into contact with said pad.

10. The cursor positioning control device as defined in claim 9 wherein, said cleaning gasket is annular and is mounted to said housing by an annular mounting clip.

11. The cursor positioning control device as defined in claim 10, and a biasing member mounted between a clip and said cleaning gasket and biasing said cleaning gasket toward said ball.

12. A method of reducing the transmission of debris, lint, moisture and oil from a movable ball in a cursor positioning device to control rollers in said cursor positioning device, which method comprises the step of:

positioning a cleaning gasket comprised of an oil and water absorbent pad having a substantially lint-free netting mounted thereto with said netting in contact with said movable ball in a location between access of debris, lint, oil and water to contact with the movable ball and the control rollers and with said pad in a position to absorb materials wiped off of said ball by said netting.

* * * * *